(12) United States Patent
Uchman

(10) Patent No.: US 7,611,415 B1
(45) Date of Patent: Nov. 3, 2009

(54) SHAFT ASSEMBLY WITH INTEGRATED CONSTANT VELOCITY JOINT

(75) Inventor: Frederick J. Uchman, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 122 days.

(21) Appl. No.: 11/039,148

(22) Filed: Jan. 19, 2005

(51) Int. Cl.
*F16D 3/205* (2006.01)

(52) U.S. Cl. ........................... 464/111; 464/905
(58) Field of Classification Search .............. 464/111, 464/905, 183, 178
See application file for complete search history.

(56) References Cited

U.S. PATENT DOCUMENTS

| | | | | |
|---|---|---|---|---|
| 3,596,478 A | * | 8/1971 | Komuzin | 464/111 |
| 3,792,596 A | * | 2/1974 | Orain | 464/111 |
| 3,817,057 A | * | 6/1974 | Orain | 464/111 |
| 4,280,340 A | * | 7/1981 | Goguet | 464/111 |
| 4,406,640 A | * | 9/1983 | Franklin et al. | |
| 4,507,100 A | * | 3/1985 | Dore et al. | 464/111 |
| 4,516,957 A | * | 5/1985 | Chyz et al. | 464/111 |
| 5,009,628 A | * | 4/1991 | Rouillot | 464/111 |
| 5,374,219 A | * | 12/1994 | Kohara et al. | 464/111 |
| 5,529,538 A | * | 6/1996 | Schulz et al. | 464/111 |
| 5,591,084 A | * | 1/1997 | Poulin et al. | 464/111 |
| 5,676,599 A | * | 10/1997 | Ricks et al. | |
| 7,252,616 B2 | * | 8/2007 | Wormsbaecher | |
| 2003/0073502 A1 | * | 4/2003 | Barnley et al. | |

OTHER PUBLICATIONS

GKN Constant Velocity Products Catalog, GKN Automotive, Inc. Auburn Hills, MI, pp. 8-11, 1993.*

* cited by examiner

*Primary Examiner*—Greg Binda
(74) *Attorney, Agent, or Firm*—Jennifer M. Brumbaugh; Mick A. Nylander

(57) ABSTRACT

A shaft assembly comprises a tubular shaft and a joint, wherein at least a portion of the joint is disposed within the tubular shaft. The present invention may also include a shaft assembly comprising a shaft and a constant velocity joint wherein the constant velocity joint is integrated into the shaft by inserting at least a portion of the constant velocity joint into the shaft. In one method of the invention, the method comprises the steps of integrating a constant velocity joint into a propeller shaft by inserting at least a portion of the constant velocity joint into the propeller shaft.

15 Claims, 8 Drawing Sheets

SHAFT ASSEMBLY WITH INTEGRATED CONSTANT VELOCITY JOINT

TECHNICAL FIELD

The present invention generally relates to a shaft assembly and in particular, to a propeller shaft, or a drive shaft, with an integrated constant velocity joint.

BACKGROUND

The propeller shaft, or drive shaft, connects a transmission output shaft to a differential shaft of a vehicle. Generally, universal joints are used to connect the propeller shaft to both the transmission output shaft on one end and the differential shaft on the other end. The universal joint should permit articulation to accommodate changes in driving angle (or road incline) between the propeller shaft and the connected output shaft or differential shaft.

Constant velocity joints are universal joints that are able to transfer torque from the transmission output shaft to the differential pinion shaft at generally large driving angles efficiently and smoothly. One type of constant velocity joint includes a tripod outer race; roller bearings; and a tripod inner member. Further, a rubber boot protects the constant velocity joint from exposure to dirt and moisture.

Typically, for use in with the propeller shaft, the constant velocity joint is welded onto the end of a tubular section of the propeller shaft. Therefore, it is desirable that the configuration of the outer race of the constant velocity joint corresponds to the configuration of the tubular section of the propeller shaft to provide an optimal surface area for welding the constant velocity joint to the propeller shaft. FIG. 1 illustrates the present practice of joining a tripod constant velocity joint 100 to a tubular section of a propeller shaft 14. The tripod constant velocity joint 100 is attached to the propeller shaft 14 by welding, as illustrated FIG. 1 by welding bead, W. To have optimal surface area for welding the constant velocity joint 100 to the propeller shaft 14, outer race 110 is generally cylindrical. However, producing the cylindrical tripod outer race 110 is difficult using traditional manufacturing extrusion processes. Specifically, it is difficult to control the width and form of roller tracks of the outer race within the tolerances required for use of the constant velocity joint in a high-speed propeller shaft.

FIG. 2 illustrates the difficulties with trying to attach a typical tripod constant velocity joint outer race 120, produced by the traditional manufacturing extrusion process, to the propeller shaft 14. The constant velocity joint 100 is provided with a tripod outer race 120 that is secured to an end of the propeller shaft 14. As illustrated, gaps exist between the tripod outer race 120 and the propeller shaft 14.

SUMMARY OF THE INVENTION

A shaft assembly comprises a tubular shaft and a joint, wherein at least a portion of the joint is disposed within the tubular shaft. The present invention may also include a shaft assembly comprising a shaft and a constant velocity joint wherein the constant velocity joint is integrated into the shaft by inserting at least a portion of the constant velocity joint into the shaft. In one method of the invention, the method comprises the steps of integrating a constant velocity joint into a propeller shaft by inserting at least a portion of the constant velocity joint into the propeller shaft.

DETAILED DESCRIPTION

Figure 1:
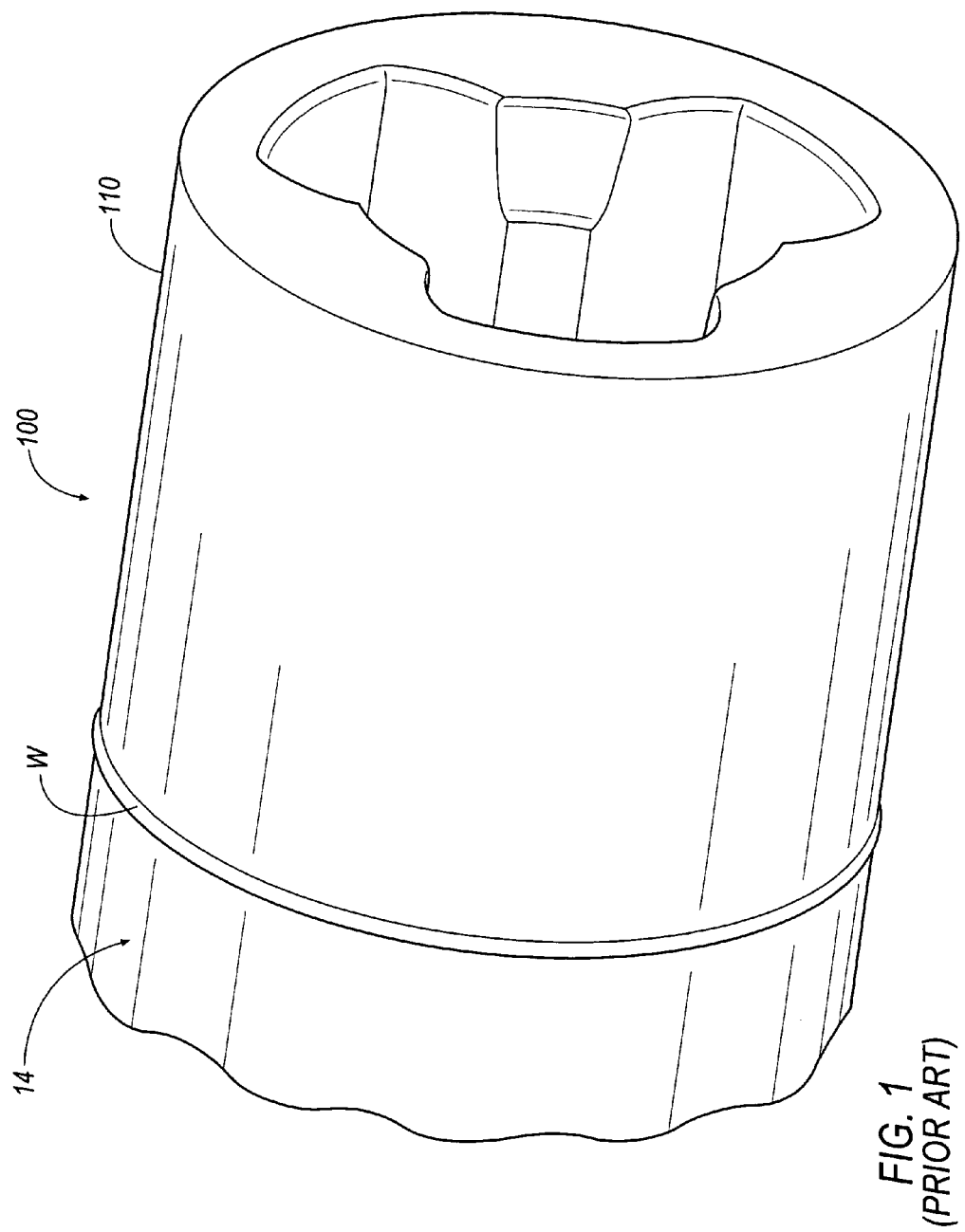
FIG. 1 is a cutaway perspective view of a prior art constant velocity tripod joint with a cylindrical outer race attached to a propeller shaft.
Figure 2:
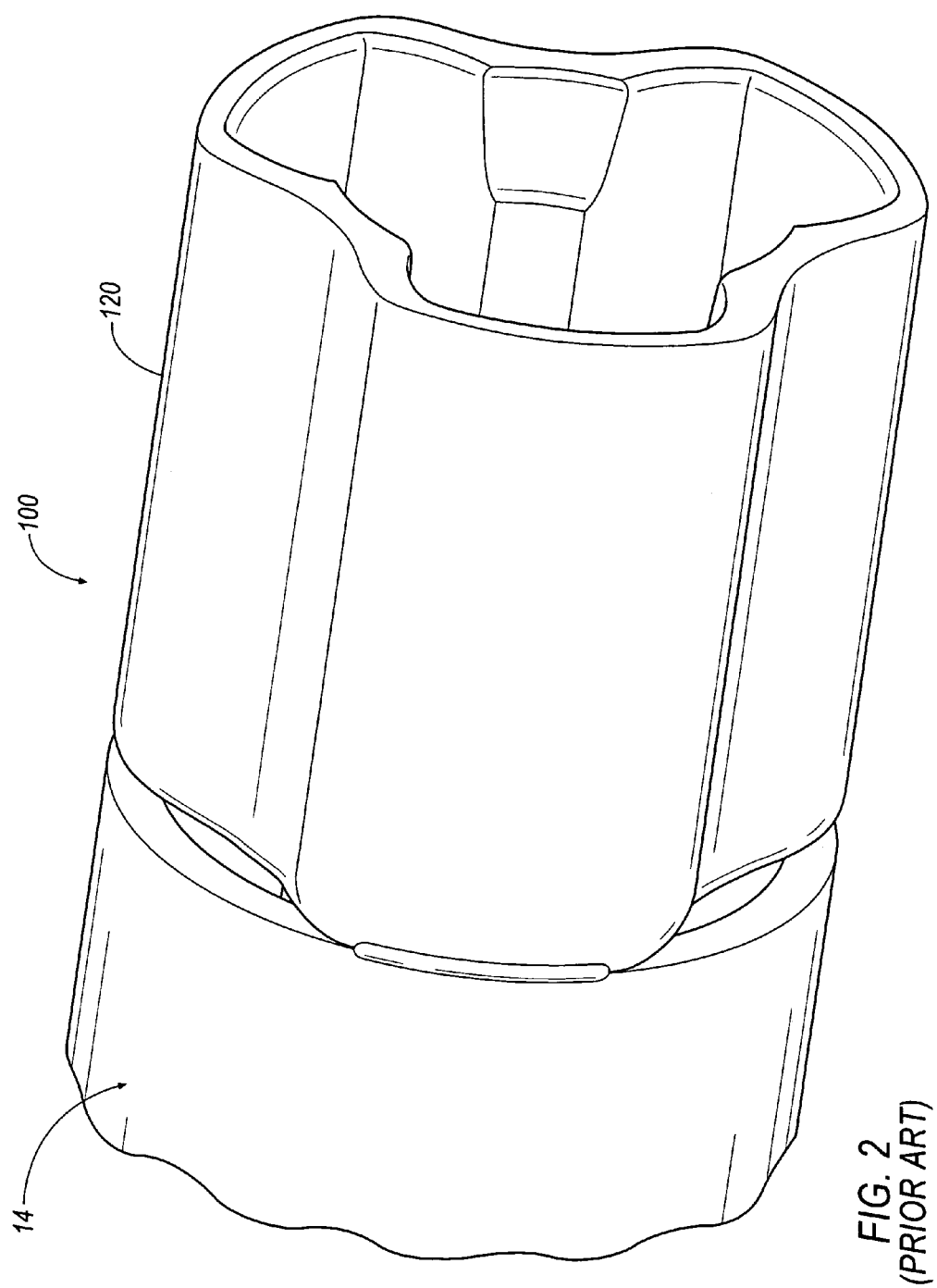
FIG. 2 is a cutaway perspective view of a tripod constant velocity joint attached to a cylindrical propeller shaft by conventional methods.
Figure 3:
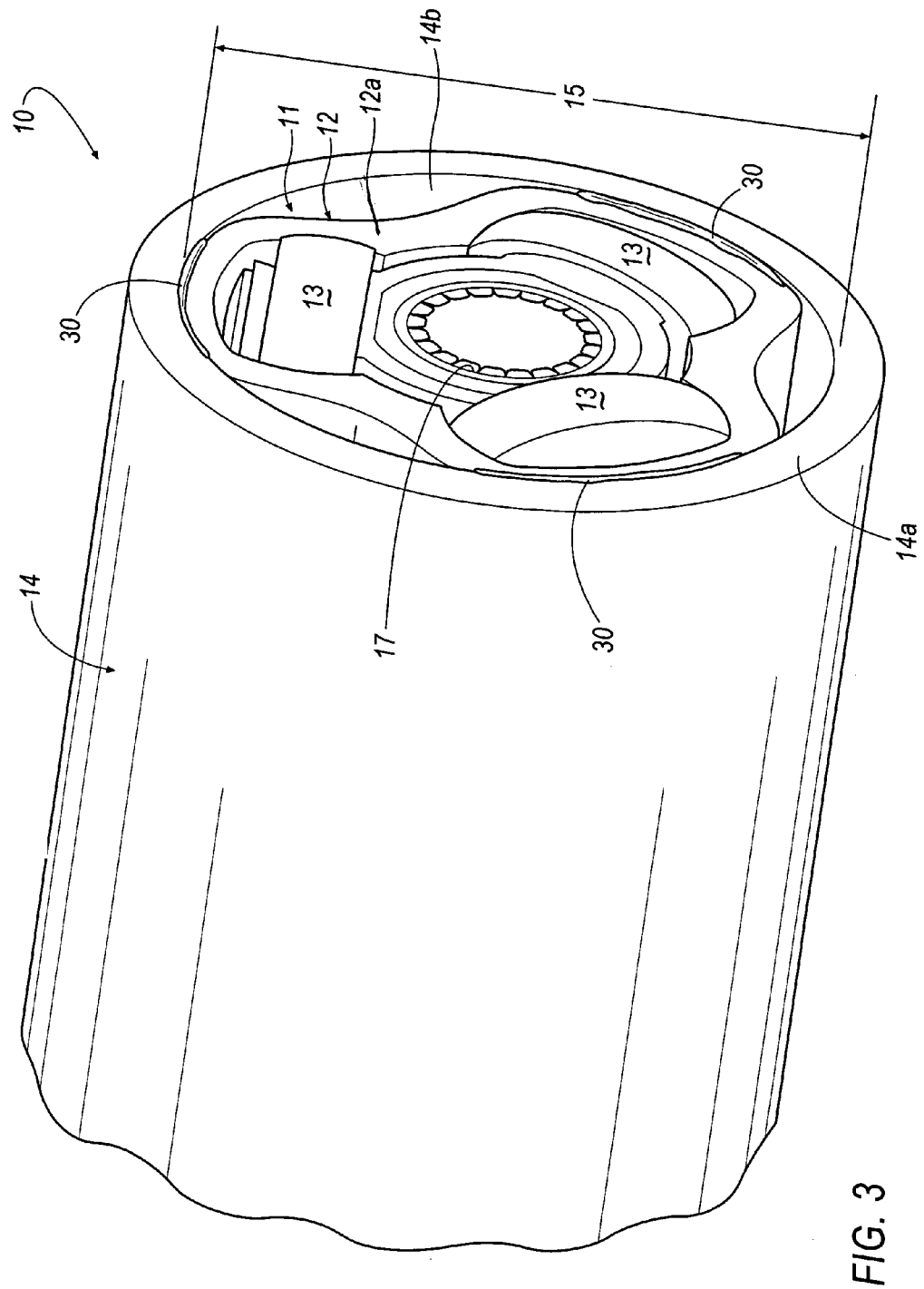
FIG. 3 is a cutaway perspective view of a tripod constant velocity joint integrated into a propeller shaft according to an embodiment of the present invention.

Tripod type constant velocity joints are one of a number of types of constant velocity joints. Referring to FIG. 3, generally shown at 10 is a cutaway of a tripod constant velocity joint 11 integrated into a first rotating shaft 14, such as, for example, a drive shaft, a propeller shaft, or the like. The constant velocity joint 11 is secured to a second rotating shaft (not shown), such as a propeller shaft, or the like. The propeller shaft 14 is typically a hollow cylindrical tube. In the illustrated embodiment, the propeller shaft 14 has an end 14a, an inner surface 14b and an internal diameter 15.

Figure 4:
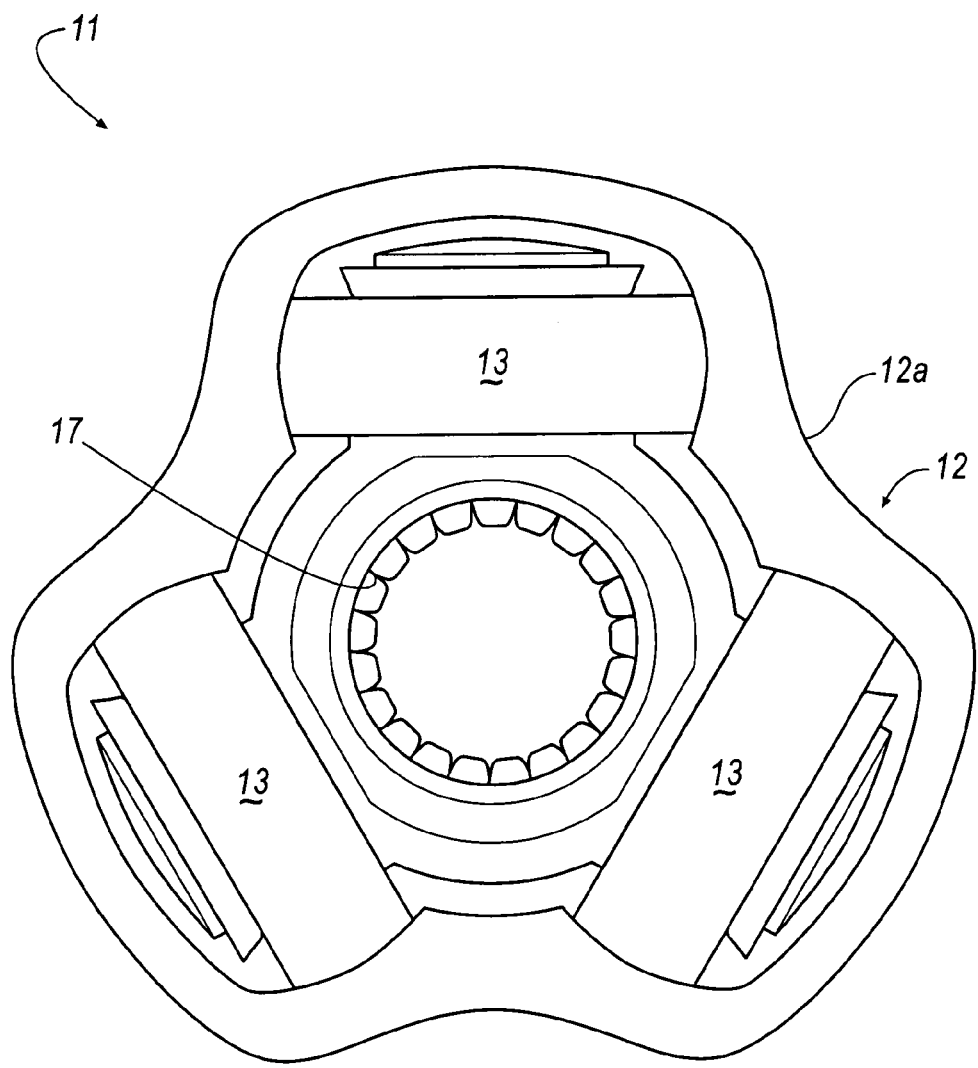
FIG. 4 is a front view of the tripod outer race of the constant velocity joint according to an embodiment of the present invention.
Figure 5:
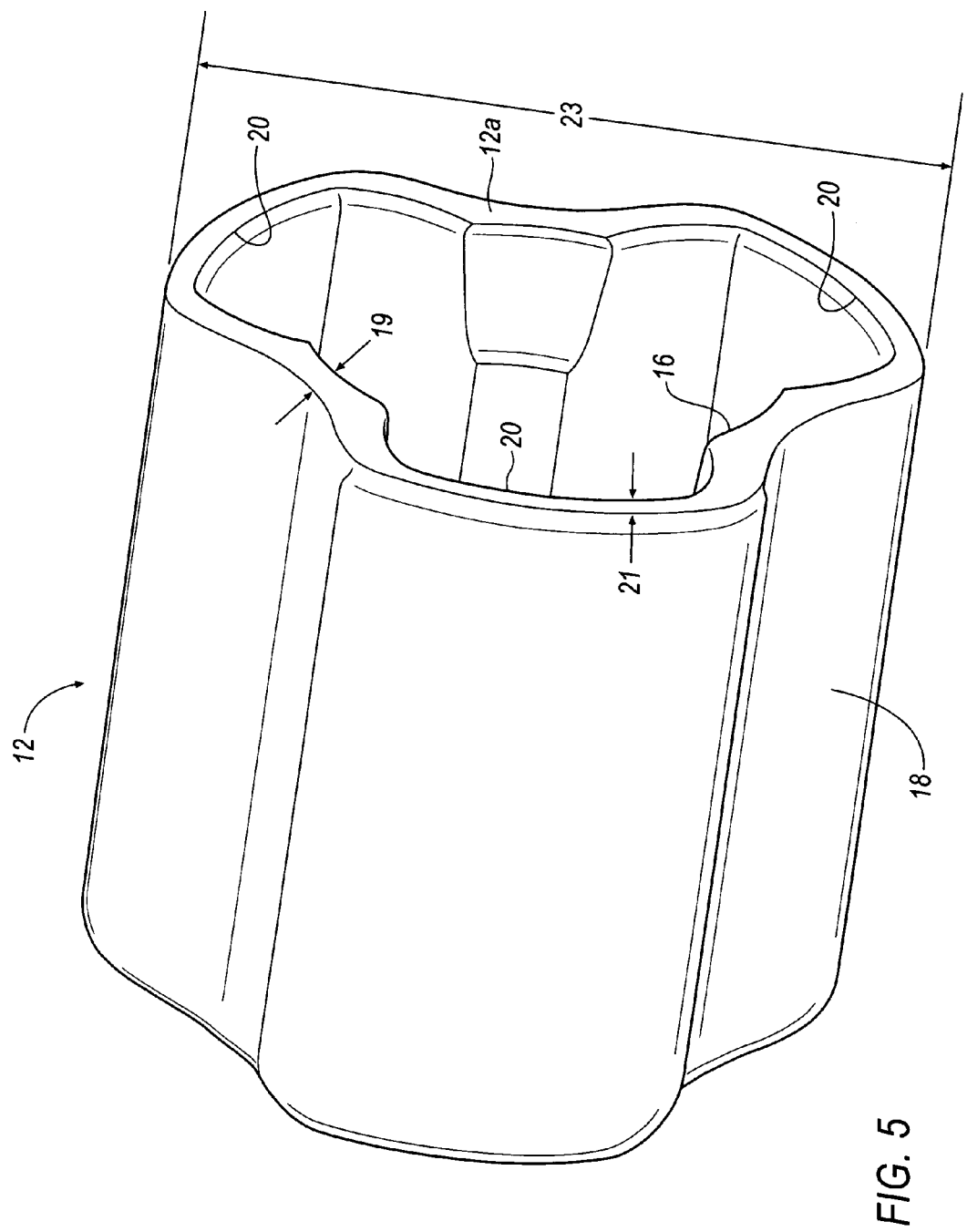
FIG. 5 is a cutaway perspective view of an outer race of the tripod constant velocity joint according to an embodiment of the present invention.

FIG. 4 illustrates the tripod constant velocity joint 11. The tripod constant velocity joint 11 includes a tripod outer race 12, roller bearings 13, a tripod inner member 17 and a rubber boot (not shown). FIG. 5 simply illustrates the tripod outer race 12 of the constant velocity joint 11. The tripod outer race 12 has an exposed surface 12a, an inner surface 16 and an outer surface 18. The tripod outer race 12 also includes cylindrical lobes 20, flutes, or the like. The lobes 20 are located at three equally spaced locations about the circumference of the tripod outer race 12. The outer surface 18 of the outer race 12 generally corresponds in shape to the lobes 20. Each of the bearings 13 engages a respective lobe 20. It can be appreciated that the present invention can be practiced with an outer race having any number of lobes.

The outer race 12 has a contour and thickness that varies in relation to the location of the lobes 20. For example, the outer race 12 has a relatively larger thickness 19 in between the lobes 20 and a relatively smaller thickness 21 at the lobes 20. However, it can be appreciated that the present invention may also be practiced with the outer race 12 having a uniform, constant thickness or any variation thereof.

The outer race 12 has an external dimension 23 generally measured between diametrically opposed portions of the outer race 12. According to an embodiment of the present invention, the constant velocity joint 11 is integrated into the propeller shaft 14 by inserting the constant velocity joint 11 into the propeller shaft 14. Thus, the external dimension 23 of the outer race 12 is machined to be slightly smaller than the internal diameter 15 of the propeller shaft 14. However, it should be noted that the present invention may be practiced with the external dimension 23 of the outer race being a slightly larger dimension than the internal diameter 15 of the propeller shaft 14, thereby creating an interference, friction, or press fit when the constant velocity joint 11 is inserted into the propeller shaft 14.

Referring back to FIG. 3, once the constant velocity joint 11 is inserted into the propeller shaft 14, a friction, or interference, fit is formed between the outer race 12 and the propeller shaft 14. When the propeller shaft 14 is rotated, a rotational force is transmitted from the propeller shaft 14 through the outer race 12 of the constant velocity joint 11, through the bearings 13 and the inner member 17 to the second rotating shaft (note shown). Further, if a central axis (not shown) of the propeller shaft 14 is not aligned with a central axis (not shown) of the second rotating shaft, each of the bearings 13 displaces relative to the lobes 20. Such movement of the bearings 13 ensures that rotation of the propeller shaft 14 and the second rotating shaft at a constant velocity is achieved.

Figure 8:
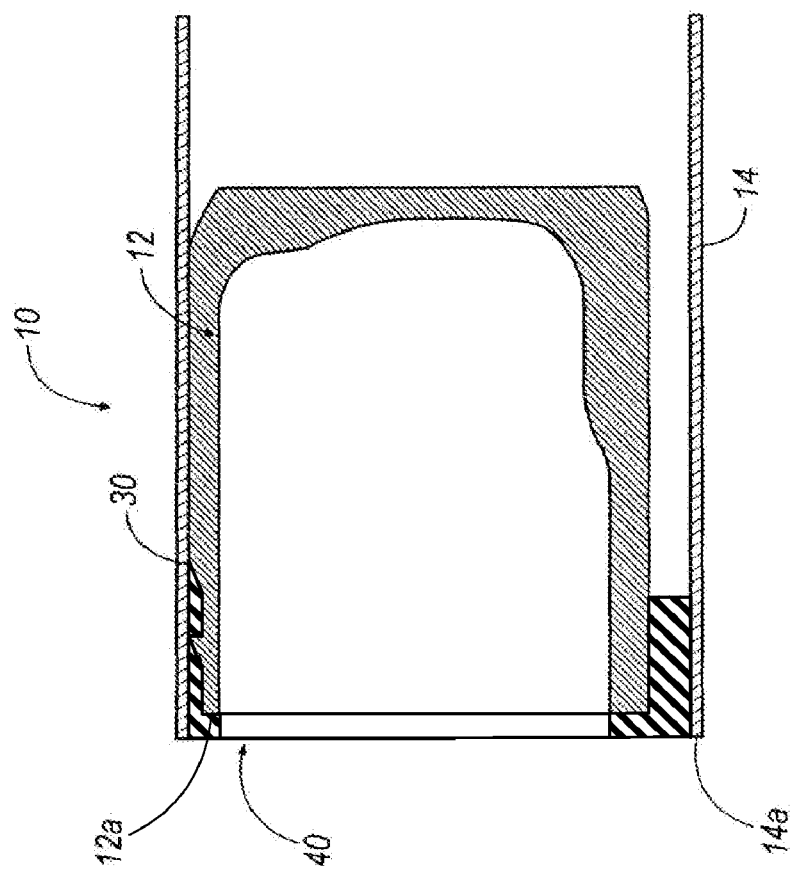
FIG. 8 is a cross-sectional view of the constant velocity joint integrated into the propeller shaft, with a tripod inner member removed for clarity, taken along line 8-8 of FIG. 7 according to an embodiment of the present invention.
Figure 9:
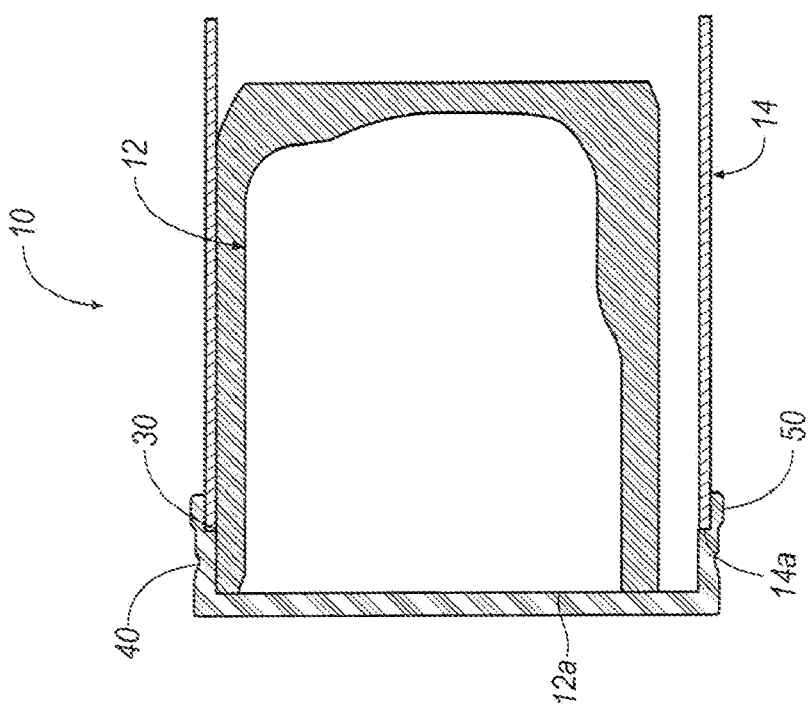
FIG. 9 is a cross-sectional view of the constant velocity joint integrated into the propeller shaft taken along line 8-8 of FIG. 7 according to an alternate embodiment of the present invention.

Alternatively, the outer race 12 may be tack welded, resistance welded, spot welded, or the like, at locations 30 along the outer race 12, as shown in FIGS. 3 and 8-9. The resistance welds 30 are located at areas where the outer race 12 and the propeller shaft 14 are in contact with each other. In another embodiment of the present invention, the exposed surface 12a of the outer race 12 may be generally welded to the circumference 14a of propeller shaft 14 by, for example, gas metal arc welding (MIG welding), laser welding, or the like. In yet a further embodiment of the present invention, the propeller shaft 14 may be crimped, for instance by hydromechanical forming, around the outer race 12 to secure the constant velocity joint 11 within the propeller shaft 14. It will be appreciated that the invention is not limited by the manner in which the constant velocity joint 11 is secured the propeller shaft 14, and that the invention can be practiced by any suitable means for securing the constant velocity joint 11 with the propeller shaft 14.

Figure 6:
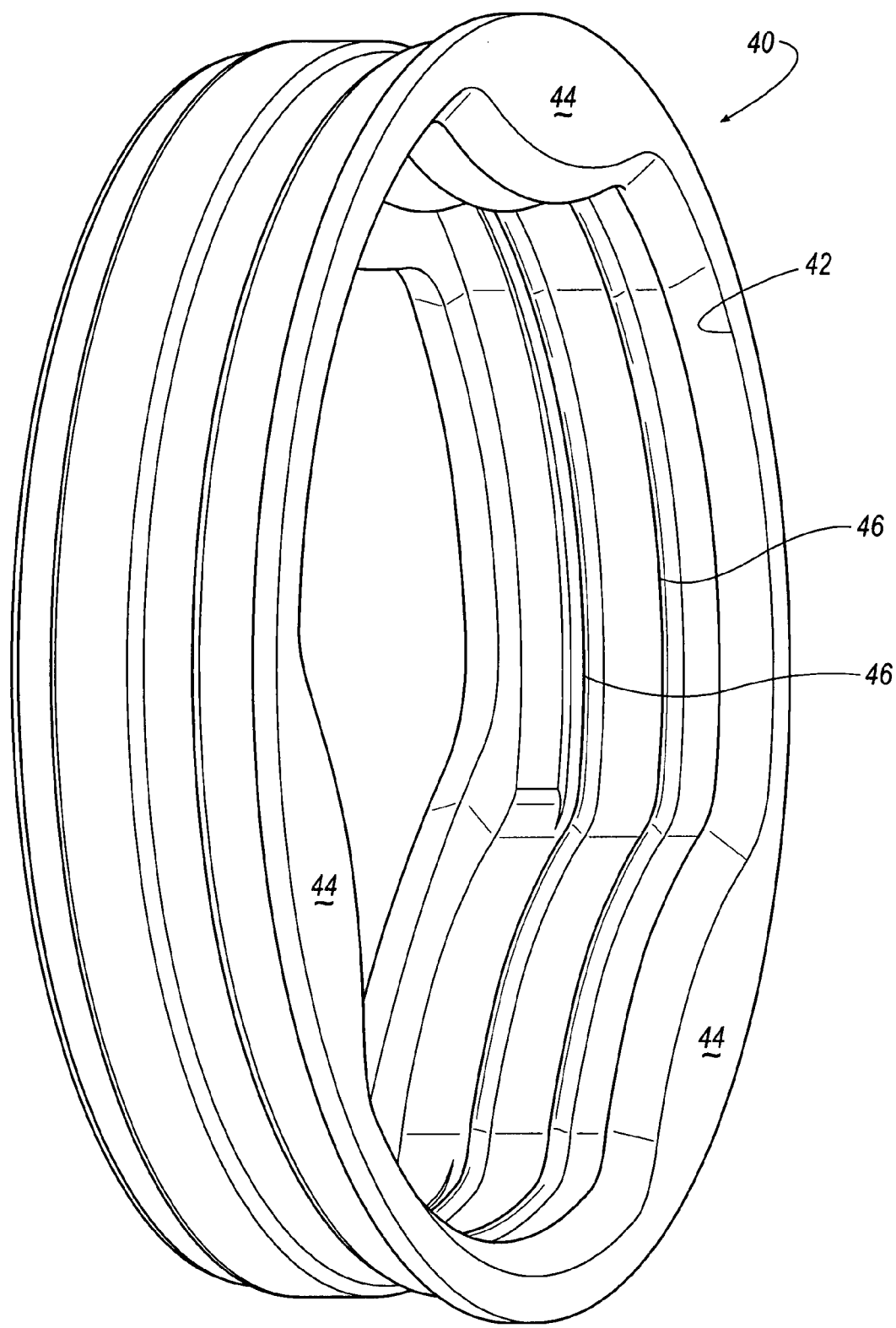
FIG. 6 is a perspective view of a seal for the constant velocity joint according to an embodiment of the present invention.
Figure 7:
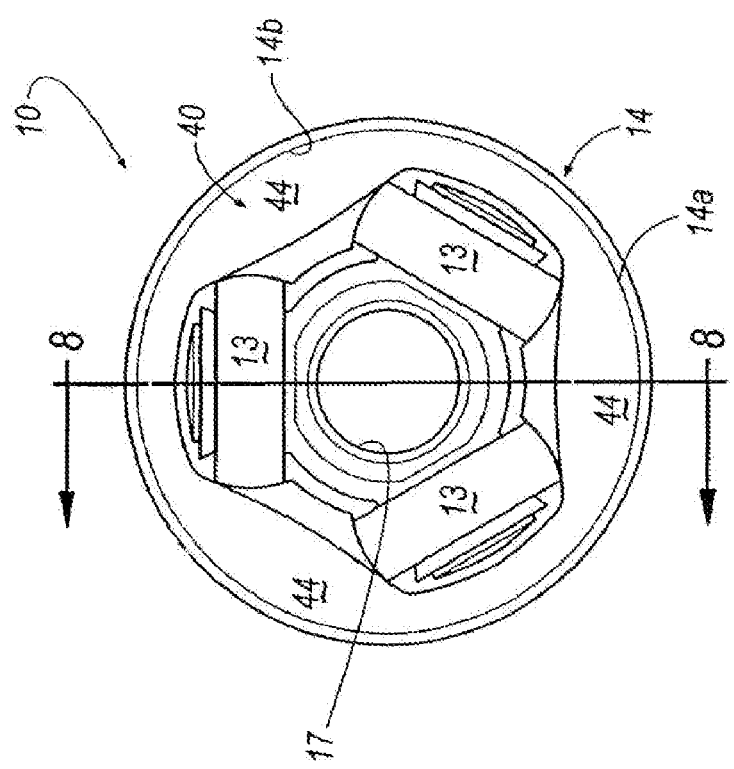
FIG. 7 is a front view of the constant velocity joint integrated into the propeller shaft and sealed according to an embodiment of the present invention.

FIG. 6 illustrates a seal 40 that can be used to prevent grease and other contaminants from entering into the propeller shaft 14. The seal 40 has a diameter that generally corresponds to the internal diameter 15 of the propeller shaft 14 and includes an aperture 42 shaped to correspond to the shape of the outer race 12. Furthermore, a portion of the seal 40 is disposed within a gap formed between the outer race 12 and the propeller shaft 14, and includes three portions 44 that extend inwardly to seal the outer race 12 around lobes 20, and ridges 46 to engage the outer surface 18 of the outer race 12. It can be appreciated that the present invention may be practiced with a seal 40 having any shape so long as the propeller shaft 14 and the integrated constant velocity joint 11 are properly sealed from grease and other contaminants. FIGS. 7 and 8 illustrate the outer race 12 integrated into propeller shaft 14 and sealed with the seal 40. Seal 40 may be secured to an end of the joint such that an end 14a of propeller shaft 14 is flush with an end of seal 40.

Figure 10:
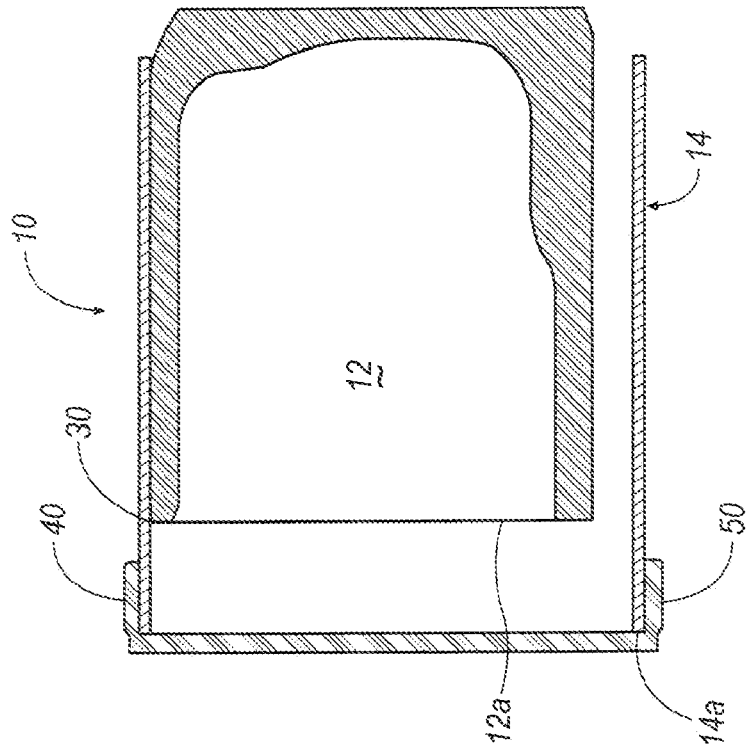
FIG. 10 is a cross-sectional view of the constant velocity joint integrated into the propeller shaft taken along line 8-8 of FIG. 7 according to a further alternate embodiment of the present invention.

It can be appreciated that the outer race 12 may be integrated into the propeller shaft 14 such that the exposed surface 12a of the outer race 12 is substantially flush with the end 14a of the propeller shaft 14 or disposed at a distance from the end 14a of the propeller shaft 14. For instance, the constant velocity joint 11 may be integrated into the propeller shaft 14 such that the exposed surface 12a of the outer race 12 extends beyond the end 14a of the propeller shaft 14, as illustrated in FIG. 9. Alternatively, the constant velocity joint 11 may be integrated into the propeller shaft 14 such that the exposed surface 12a of the outer race 12 is located at a distance within the propeller shaft 14, as illustrated in FIG. 10. It should be noted that FIGS. 9 and 10 show seal 40 as having a lip 50 that engages and seals the outer surface 14a of the propeller shaft 14.

Integrating the constant velocity joint 11 into the propeller shaft 14 according to the present invention allows for ease in manufacturing of the tripod outer race 12 without decreasing the performance of the constant velocity joint 11. The tripod outer race 12 may be manufactured with the outer and inner surfaces 16, 18 corresponding in shape, and the propeller shaft 14 may be manufactured as a hollow cylindrical tube. However, the constant velocity joint 11 may still be integrated into the propeller shaft 14 even with the tripod outer race 12 and the propeller shaft 14 having different configurations.

The embodiments disclosed herein have been discussed for the purpose of familiarizing the reader with novel aspects of the invention. Although various embodiments of the invention have been shown and described, many changes, modifications and substitutions may be made by one having ordinary skill in the art without necessarily departing from the spirit and scope of the invention as described in the following claims.

What is claimed is:

1. A shaft assembly comprising:
a tubular shaft;
a tripod constant velocity joint at least partially disposed within the tubular shaft, the joint engaging an inner surface of the shaft; and
a seal connected to the tubular shaft, the seal engaging an entire outer circumferential perimeter of the joint at a location inboard of the ends of the joint, wherein the portion of the joint disposed within the tubular shaft is fixedly connected to the tubular shaft.

2. The shaft assembly of claim 1, wherein the tubular shaft has a cylindrical inner surface.

3. The shaft assembly of claim 1, wherein the joint includes an outer race having a plurality of lobes.

4. The shaft assembly of claim 3, further including a gap between an outer surface of the outer race and the tubular shaft.

5. The shaft assembly of claim 4, wherein a portion of the seal is disposed in the gap between the outer surface of the outer race and the tubular shaft.

6. The shaft assembly according to claim 1, wherein the joint is secured to the shaft by welding the constant velocity joint to the shaft.

7. The shaft assembly according to claim 1, wherein the joint is integrated into the shaft by forming an interference fit between the constant velocity joint and the shaft.

8. The shaft assembly according to claim 1, wherein the seal is secured to an end of the joint such that an end of the shaft is flush with respect to an end of the seal when the joint is integrated into the shaft.

9. The shaft assembly according to claim 1, wherein an end of the joint and an end of the shaft are positioned at a distance with respect to each other when the joint is integrated into the shaft.

10. The shaft assembly of claim 9, wherein the end of the joint is spaced inwardly from an end of the shaft.

11. The shaft assembly of claim 9, wherein the seal is disposed around and is in contact with the end of the joint.

12. The shaft assembly of claim 1, wherein an outer periphery of the joint and an inner periphery of the shaft define a continuous uninterrupted circumferential gap between the shaft and the joint.

13. The shaft assembly of claim 1, wherein an outer periphery of the joint and an inner periphery of the shaft define a continuous uninterrupted circumferential gap between the shaft and the joint, the seal disposed within the gap so as to circumferentially fill the entire gap.

14. The shaft assembly of claim 1, wherein the joint includes an outer race having a plurality of lobes, at least one of the plurality of lobes includes a first portion and a second portion aligned along a common axial line with the first portion, the first portion engages the tubular shaft and the second portion is displaced away from the shaft and engages the seal.

15. The shaft assembly of claim 1, wherein the tubular shaft is at least one of a propeller shaft and a drive shaft, each of which is operable for transferring a torque.

* * * * *

UNITED STATES PATENT AND TRADEMARK OFFICE
CERTIFICATE OF CORRECTION

PATENT NO. : 7,611,415 B1
APPLICATION NO. : 11/039148
DATED : November 3, 2009
INVENTOR(S) : Frederick J. Uchman Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Twelfth Day of October, 2010

David J. Kappos
*Director of the United States Patent and Trademark Office*